May 9, 1933.  A. DINA  1,907,753
GATE ON LENS MOUNTING APPARATUS FOR MOTION PICTURE PROJECTION MACHINES
Filed Oct. 28, 1929  5 Sheets-Sheet 1

INVENTOR
Augusto Dina
BY
Howard W. Dix
ATTORNEY

May 9, 1933.                    A. DINA                    1,907,753
GATE ON LENS MOUNTING APPARATUS FOR MOTION PICTURE PROJECTION MACHINES
              Filed Oct. 28, 1929         5 Sheets-Sheet 2
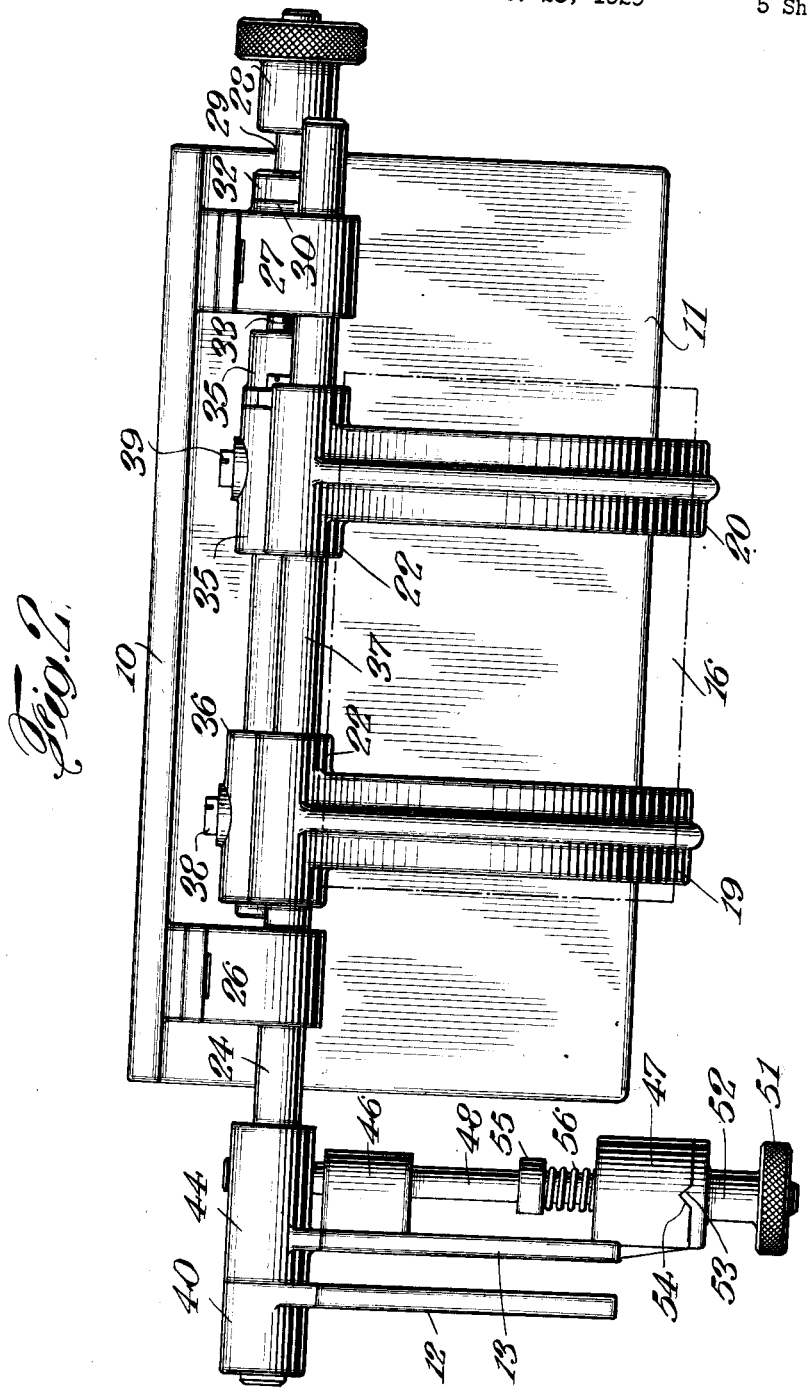
INVENTOR
Augusto Dina
BY
Howard W Dix
ATTORNEY

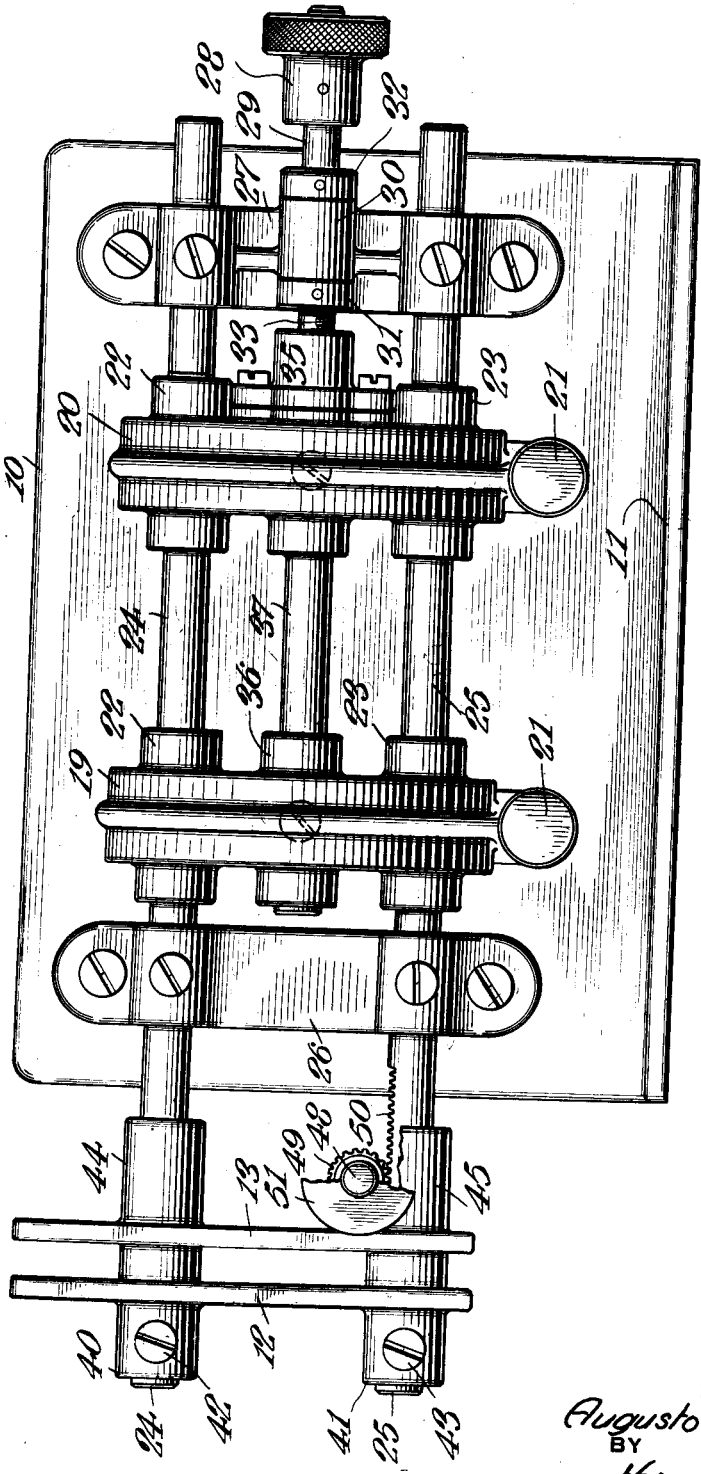

May 9, 1933.  A. DINA  1,907,753
GATE ON LENS MOUNTING APPARATUS FOR MOTION PICTURE PROJECTION MACHINES
Filed Oct. 28, 1929  5 Sheets-Sheet 4
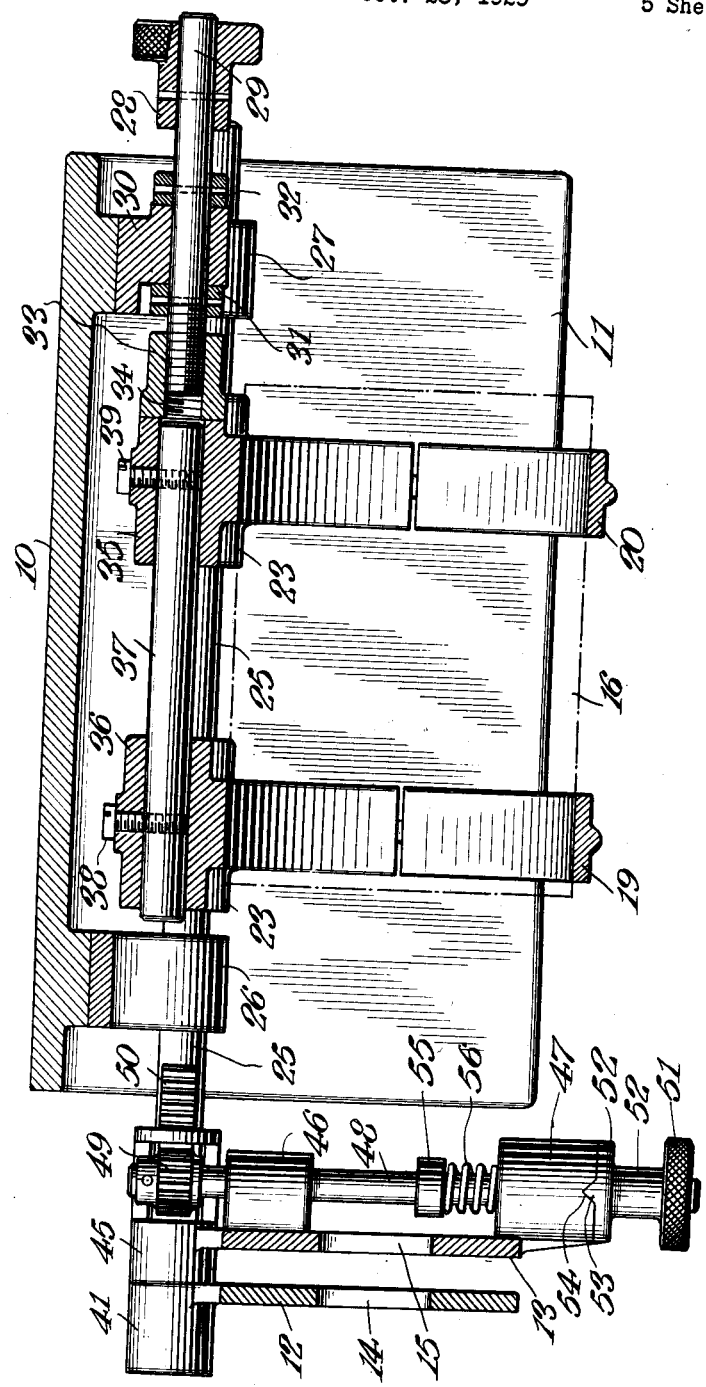
INVENTOR
Augusto Dina
BY
Howard W. Dix
ATTORNEY

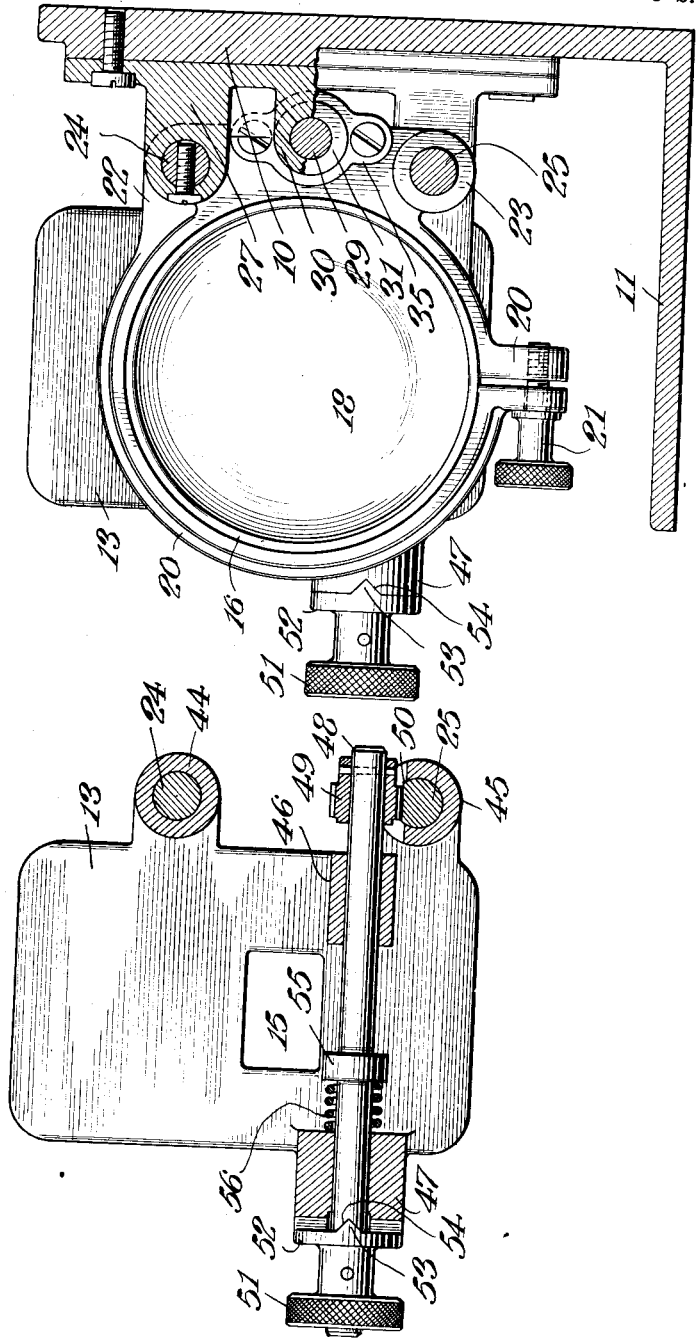

Patented May 9, 1933

1,907,753

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

GATE ON LENS MOUNTING APPARATUS FOR MOTION PICTURE PROJECTION MACHINES

Application filed October 28, 1929. Serial No. 402,847.

This invention relates to motion picture apparatus and particularly to projectors and has especial reference to new and useful improvements in mounting, operating, and adjusting the film gate, the gate door, and the lens combinations with their associated tubes protectively and telescopically associated therewith.

A main object of the invention is to provide a simple, efficient, compact, durable mechanism whereby the film gate and door and the lens mounting mechanism are capable of being operated and adjusted with utmost ease and simplicity and accuracy.

Another object is to provide a simple, compact mounting unit and support for both the film gate and door and the lens combinations so that it is simplified greatly as compared to other forms now in use, and to provide a simple form which is manufactured at a much lower cost than has heretofore been possible.

A still further object is to provide a simple compact assembly of associated mechanism as above described which can be easily and quickly assembled and disassembled from the machine for replacements and repair.

Further and more specific objects, features, and advantages will more clearly appear from the detailed description given below when taken in connection with the accompanying drawings which form part of the specification and which illustrate one present preferred form of the invention.

In general terms, the invention involves the disposition on the projection head of a plurality of spaced supporting members on which the film gate, the film gate door, and the lens holding frames and telescoping tubes are slidably mounted. These supporting members are linear in character and accurately assembled parallel to the axis of the projection light so that when the lens combinations or the film gate door are adjusted along the supports, the adjustment is along the axis and with absolute accuracy.

The film gate door is adjustably mounted as before stated and its operating mechanism is such that for one or more predetermined positions of the door, the door is locked or latched in these predetermined positions. These positions for instance may be the closed position, when the door is closely adjacent the gate and pressing against the film, and another position may be when the door is full open and away from the gate to permit the threading adjustment and manipulation of the film. The movement of the door from one of its predetermined positions to another is effected by a single element such as a hand knob, which is given a single uni-directional movement in either one direction or in the opposite direction, and in so moving the element the door is first unlatched from a given position and then moved to the other position after which automatic latching takes place when the new position is achieved without any especial effort on the part of the manipulator other than the single uni-directional movement above referred to.

For instance, the door is moved merely by the turning of a hand knob which the operator grasps and turns and in so doing, the knob is first unlatched to release the door and then the door is advanced to the new position at which time it is automatically latched merely by the continued turning movement of the knob.

In connection with the lens combinations which are mounted in suitable frames on the above mentioned supports, they are provided with a simple and compact adjusting means whereby the combinations may be accurately and with a high degree of fineness adjusted along the supports, merely by the turning of another knob. The fact that the supports are accurately alined with respect to the optical axis insures that any adjustment of either the door or the lenses will be maintained with these elements in proper alinement with said axis altho at different points therealong.

The present preferred form of the invention is illustrated in the drawings, of which, Fig. 1 is a perspective view of the invention as applied to one type of a motion picture apparatus;

Fig. 2 is a plan view of the preferred form;

Fig. 3 is a side elevational view thereof;

Fig. 4 is a horizontal longitudinal section through the device;

Fig. 5 is a vertical cross section through the gate door adjusting and operating mechanism; and, Fig. 6 is a similar section through the mechanism for adjusting and operating the lenses and lens tubes.

Figure 1:
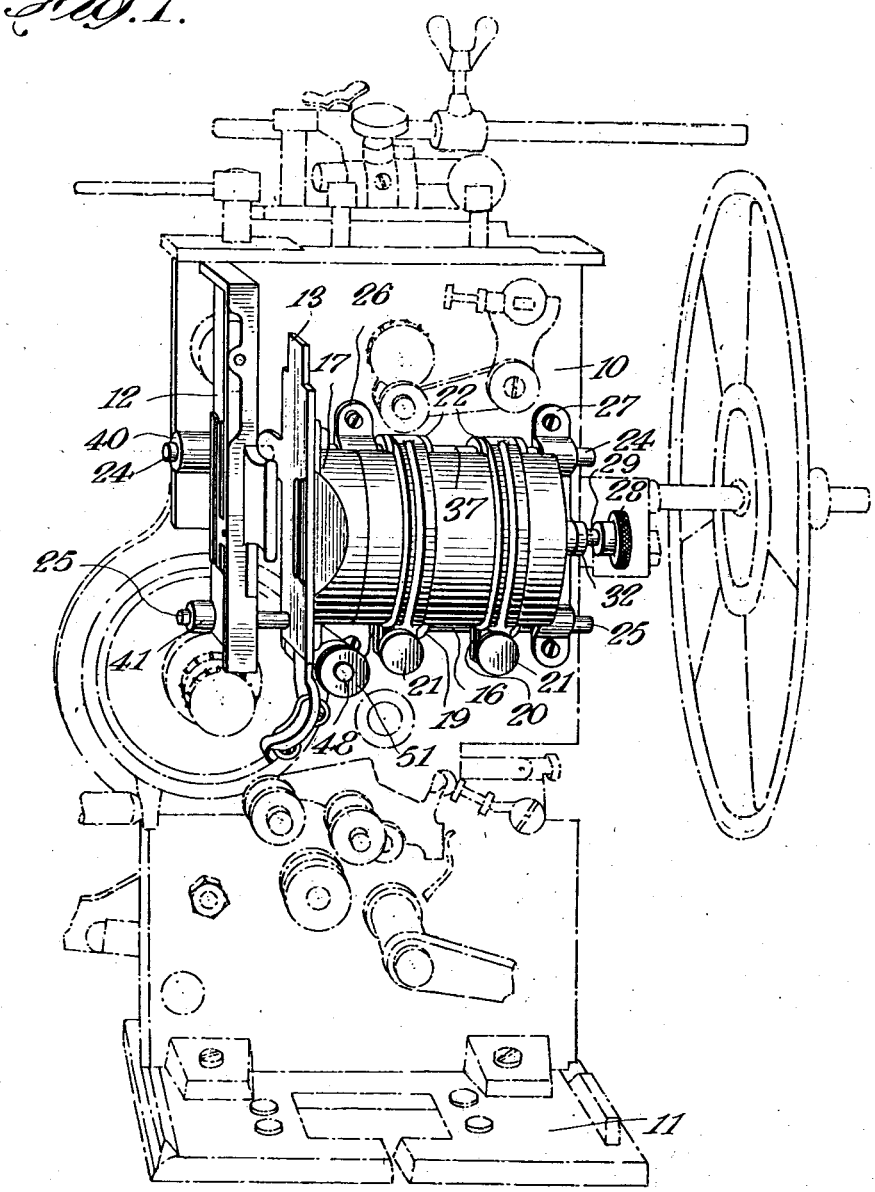

As shown in the drawings, therefore, the present preferred form of the invention includes a partition 10 which is generally a central longitudinally extending wall in the projection head of the projector and carries a substantial part of the operating mechanism thereon. The wall or partition 10 may or may not be provided with a base plate such as 11. Associated with the partition 10 are the film gate 12 and the gate door 13 having alined apertures 14 and 15 (Fig. 4) through which the projection light passes to the lens combinations beyond.

Also associated with the partition 10 is the lens combination tube 16 and its telescopic partner 17 which as usual is adapted to be continually pressed against the adjacent face of the door 13 to maintain a continuous passage closed for the light beam as it passes through the apertures 14 and 15 and thence through the lenses such as 18 to the screen.

The lens tubes 16 and 17 are supported in ring frames 19 and 20 each provided with clamping nuts 21. These frames are provided with laterally disposed lugs or heads such as 22 and 23 bored to receive and slide along supporting rods or members such as 24 and 25. These rods are fastened to the partition 10 by means of brackets 26 and 27 and are disposed parallel to each other and parallel to the axis of the projection light. Therefore as the lens tubes are slid along the rods 24 and 25 they are capable of being readily focussed but are always in accurate alinement with the optical axis. The adjustment of the lenses along the optical axis is accomplished by means of the hand knob 28 on the shaft 29 which extends through a bore in the lug 30 on the bracket 27. Collars 31 and 32 are pinned to the shaft 29 on each side of the lug 30 to prevent the shaft 29 from moving longitudinally, altho permitting it to turn.

The outer end of the shaft 29 is threaded as at 33 (Fig. 4) and is received in a threaded bore 34 in another lug 35 on the lens ring frame 20. By turning the shaft 29 the frame 20 is moved along the rods 24 and 25. The other ring frame 19 is also provided with a lateral lug 36 bored to receive one end of the connecting rod 37 extending from the bore in the lug 35 on the ring frame 20. This rod 37 is held in the lugs 35 and 36 by means of clamping screws 38 and 39. Thus the two ring frames 19 and 20 will move as one in either direction when the knob 28 is turned in one direction or in the other.

It will be noted from Figs. 3 and 4 that the rods or supports 24 and 25 extend to the left beyond the bracket 26 and on the ends of the rods 24 and 25 are fastened bored lugs 40 and 41 by means of clamping screws 42 and 43. These lugs 40 and 41 support the film gate 12, which may be of the usual type and construction, as above described. Between the film gate 12 and the bracket 26 and supported on the rods 24 and 25 are lugs 44 and 45 bored to receive the rods 24 and 25 and supporting the above described film gate door 13.

Supported across one face of the door 13 preferably that face adjacent the bracket 26 are two bored lugs 46 and 47 acting as journals for a shaft 48 which is disposed below the level of the aperture 15 in the door 13. On one end this shaft 48 carries a gear 49 meshing with a rack 50 formed integrally or otherwise on the lower rod 25 at this point. The other end of the shaft 48 carries a hand knob 51 mounted on a bushing 52 the inner face of which is provided with a bevelled tongue 53. This tongue 53 is adapted to fit, when desired, into a notch 54 on the adjacent face of the lug 47. The shaft 48 intermediate its ends has a collar 55 against which a spring 56 bears at one end, the other end of the spring 56 bearing against the face of the lug 47. This spring 56 tends to keep the shaft 48 in the right hand position and thus tends to always force the tongue 53 into the notch 54 when the two are alined.

The door has at least two well known desired and practical positions with respect to the gate 12 which it assumes during the operation of the projector mechanism. One is when the door is closed against the gate 12 and pressing the film, and the other position is when the door is moved away from the gate to permit the film to be removed or inserted or adjusted in any desired manner. It is especially desirable that when the door is in either of these two positions, it be locked or latched therein and therefore the rack 50, the gear 49 and the disposition of the tongue 53 and the notch 54 are so designed and related that when the door is in either of these positions the latching will automatically take place.

It will be observed that the telescopic section 17 of the lens tubes will move backward and forward as usual with the door 13 as it is moved to and fro and thus provide a continuous passage for protecting the light through the apertures 14 and 15 to the lenses 18 and to the screen.

In the operation of the invention, the lenses are focussed or adjusted by turning the knob 28 which will move the ring frames 19 and 20 back and forth as desired. The pitch of the thread on the end of the shaft 29 is fine enough to permit of a very nice degree of adjustment. With the door shown in the closed position as in Fig. 4, when it is desired to move it away from the gate 12, it is merely necessary to start turning the knob 51. The first action is to disengage the tongue 53 from the notch 54 which will then permit further movement of the knob to turn the gear 49 on the rack 50 and move the door 13 to the right. As the door arrives at the desired open position, the design of the parts is such that the tongue and the notch will again be in alinement and latch the door in the open position. Thus the unlatching, moving, and relatching of the door 13 is effected by a single uni-directional movement of the knob 51 and the rest of the action takes place automatically.

This invention therefore, provides a simple, compact, durable, rugged, and efficient supporting device or unit for the film trap and lens mounting devices which will readily permit these mechanisms to be easily adjusted with respect to the film and to each other and yet keep them in absolutely accurate alinement with the axis of the optical system, and this at all times. The fact that the two mechanisms are mounted on the same accurately alined support makes it so much more possible to keep them in accurate alinement, and at the same time presents a structure which is simple and relatively economical to manufacture.

It is also seen that the invention provides an original assembly for the film gate and door and for the lens mounts which can as a unit be attached to the head and easily and quickly removed therefrom as a unit for replacement and repair, while at the same time permitting, when mounted on the head a very accurate adjustment of the parts while they are maintained in absolute accurate alinement with the optical axis which is of extreme importance in well designed projectors and motion picture apparatus.

While the invention has been described in detail and with respect to a present preferred form thereof, it is to be understood that it is not to be limited to such details or forms since many changes and modifications may be made and the invention embodied in other forms without departing from the spirit and scope of the invention in its broader aspects. Hence it is desired to cover any and all forms and modifications coming within the spirit and scope of any one or more of the appended claims.

What is claimed is,

1. In a motion picture machine, a pair of spaced rods parallel to each other and to the optical axis of the machine, a partition to which said rods are fastened, a film gate having an aperture therein and adjustably fixed to the rods, a gate door associated with the gate and slidable along the rods, means for adjusting the door with relation to the gate, means for latching the door in predetermined positions along the rods, lens holding means slidably mounted on the rods, and means for adjusting the lens holding means on the rods.

2. In a motion picture machine, a pair of spaced rods disposed parallel to each other and to the optical axis of the machine, film trap mechanism adjustably supported on said rods, a pair of lens holding elements slidably supported on said rods, a bar connecting said elements to space them from each other, a shaft fixed on the machine and threadably engaging one of said elements, and means on said shaft to turn it whereby said elements, as a unit may be adjusted along said rods.

This specification signed this 26th day of October, 1929.

AUGUSTO DINA.